US009321933B2

(12) United States Patent
Terasaki et al.

(10) Patent No.: US 9,321,933 B2
(45) Date of Patent: Apr. 26, 2016

(54) COATING COMPOSITION AND COATED BODY

(71) Applicant: TOTO LTD., Kitakyushu-shi, Fukuoka (JP)

(72) Inventors: Hiroshi Terasaki, Gifu-ken (JP); Yuki Kondo, Aichi-ken (JP)

(73) Assignees: Toto Ltd., Fukuoka (JP); Toto Okitsumo Coatings Ltd., Aichi-ken (JP)

( * ) Notice: Subject to any disclaimer, the term of this patent is extended or adjusted under 35 U.S.C. 154(b) by 0 days.

(21) Appl. No.: 14/628,479

(22) Filed: Feb. 23, 2015

(65) Prior Publication Data
US 2015/0240107 A1 Aug. 27, 2015

(30) Foreign Application Priority Data

Feb. 24, 2014 (JP) .................................. 2014-032647
Mar. 20, 2014 (JP) .................................. 2014-057375

(51) Int. Cl.
| C09D 133/00 | (2006.01) |
| C09D 183/04 | (2006.01) |
| C08K 3/22 | (2006.01) |
| C08K 3/36 | (2006.01) |

(52) U.S. Cl.
CPC ............... *C09D 133/00* (2013.01); *C08K 3/22* (2013.01); *C08K 3/36* (2013.01); *C09D 183/04* (2013.01); *C08K 2003/2227* (2013.01); *C08K 2003/2241* (2013.01)

(58) Field of Classification Search
None
See application file for complete search history.

(56) References Cited

U.S. PATENT DOCUMENTS

| 5,616,532 A * | 4/1997 | Heller .................... B01J 35/002 502/242 |
| 5,755,867 A | 5/1998 | Chikuni et al. |
| 6,217,999 B1 * | 4/2001 | Zhang ..................... B01J 13/02 427/213.34 |
| 2004/0031642 A1 * | 2/2004 | Hokkirigawa ......... B01J 35/004 181/207 |
| 2009/0123647 A1 * | 5/2009 | Liu ........................ C03C 17/007 427/240 |
| 2011/0082027 A1 * | 4/2011 | Kitazaki ................ B01J 21/063 502/159 |

FOREIGN PATENT DOCUMENTS

| JP | H09-227829 A | 9/1997 |
| JP | 2004-051644 A | 2/2004 |
| JP | 2008-038113 A | 2/2008 |
| JP | 2008-095069 A | 4/2008 |
| JP | 2010-106266 A | 5/2010 |

* cited by examiner

*Primary Examiner* — Robert S Loewe
(74) *Attorney, Agent, or Firm* — Carrier Blackman & Associates, P.C.; Joseph P. Carrier

(57) ABSTRACT

There is provided a coating composition that can form a coating film excellent in both weather fastness and hydrophilifiability. The coating composition includes: a Si-containing resin; photocatalyst particles; and an aqueous medium, the Si-containing resin and the photocatalyst particles being dispersed in the aqueous medium, wherein the Si-containing resin includes a polysiloxane segment, preferably exhibits at least one spectral peak at a position of 120° C. or more to 180° C. or less in a curve of loss tangent (tan δ) against temperature as measured at a frequency of 1 Hz with a solid viscoelasticity measuring apparatus based on JIS K 7244-4, and has a particle diameter that is not more than 1/15 of the particle diameter of the photocatalyst particles.

10 Claims, 1 Drawing Sheet

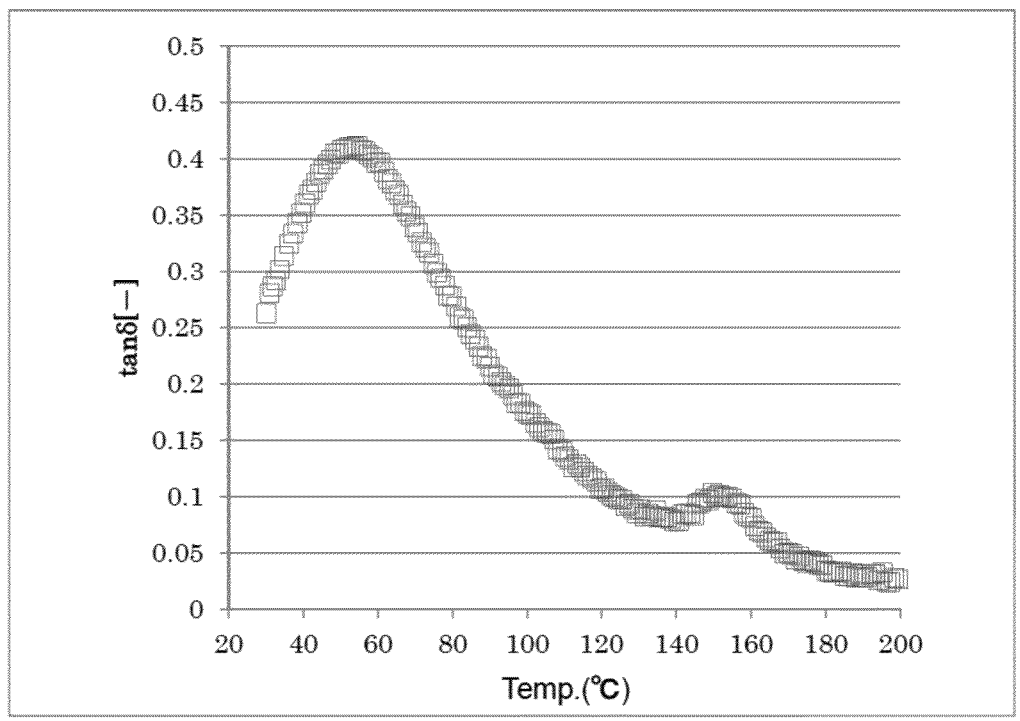

COATING COMPOSITION AND COATED BODY

FIELD OF INVENTION

The present invention relates to a coated body having excellent weather fastness and hydrophilicity and applicable in various fields including buildings, and a coating composition for the coated body.

BACKGROUND ART

Photocatalysts such as titanium oxide have recently been extensively utilized. Various harmful substances can be decomposed through the utilization of the activity of the photocatalyst excited by photoenergy. Further, the surface of members with a photocatalyst particle-containing surface layer formed thereon can be hydrophilified to allow foulings deposited on the surface to be easily washed away with water. In photocatalyst-containing coating compositions, silicone resins that are less likely to be influenced by oxidative decomposition induced by photocatalysts have been used as suitable binders.

For example, JP H09-227829A (PTL 1) discloses a coating composition including photocatalyst particles, silicone, and an alcoholic solvent. JP 2004-51644A (PTL 2) discloses a coating composition that utilizes an aqueous silicone emulsion from the viewpoint of reducing environmental burden.

Coating films formed by using these coating compositions are relatively hard. For example, when the base undergoes deformation due to exposure to external force or temperature change, in some cases, the coating films cannot be conformed to the deformation of the base, resulting in separation of the coating films or cracking in the coating films. Therefore, a resin emulsion obtained by compositing a polymerizable monomer such as an unsaturated double bond-containing organic compound with a silane compound has been proposed as a binder to form coating films having enhanced base conformability and improved cracking resistance. For example, JP 2008-38113A (PTL 3) discloses a silicone-modified resin emulsion obtained by emulsion-polymerizing an ethylenically unsaturated monomer and an alkoxysilane containing a functional group copolymerizable with the monomer in the presence of a reactive emulsifier. JP 2008-95069A (PTL 4) and JP 2010-106266A (PTL 5) disclose a water dispersion of a composite resin with acid group-containing polymer segments and polysiloxane segments bound to each other.

CITATION LIST

Patent Literature

[PTL 1] JP H09-227829A
[PTL 2] JP 2004-51644A
[PTL 3] JP 2008-38113A
[PTL 4] JP 2008-95069A
[PTL 5] JP 2010-106266A

SUMMARY OF THE INVENTION

The present inventors have found that, in coating films formed of a coating composition obtained by mixing these conventional composite resins with photocatalyst particles, there is a trade-off relationship between weather fastness and hydrophilification. That is, it has been found that coating films having excellent weather fastness require a long period of time for hydrophilification while coating films that can be quickly hydrophilified are likely to have poor weather fastness. An object of the present invention is to provide a coating composition that can form coating films excellent in both weather fastness and hydrophilifiability.

The present inventors have now found that excellent weather fastness and hydrophilifiability can be simultaneously realized in coating films by combining Si-containing resins containing polysiloxane segments and photocatalyst particles having a large particle diameter. Further, they have found that the use of specific Si-containing resins can realize excellent weather fastness and hydrophilifiability on a higher level in coating films. The present invention has been made based on such finding.

Thus, according to one aspect of the present invention, there is provided a coating composition comprising: a Si-containing resin; photocatalyst particles; and an aqueous medium, the Si-containing resin and the photocatalyst particles being dispersed in the aqueous medium, wherein the Si-containing resin comprises a polysiloxane segment and the Si-containing resin has a particle diameter that is not more than $1/15$ of the particle diameter of the photocatalyst particles.

In a preferred embodiment of the present invention, the polysiloxane segment contains a trifunctional polysiloxane segment, and the Si-containing resin exhibits at least one spectral peak at a position of 120° C. or more to 180° C. or less in a change curve of loss tangent (tan δ) against temperature as measured at a frequency of 1 Hz with a solid viscoelasticity measuring apparatus based on JIS K 7244-4.

The present invention provides a coating composition that can form a coating film that is excellent in both weather fastness and hydrophilifiability.

BRIEF DESCRIPTION OF THE DRAWINGS

FIG. 1 is a change graph of loss tangent (tan δ) against temperature as measured in Example 1.

DETAILED DESCRIPTION OF THE INVENTION

Si-Containing Resin

The Si-containing resin used in the present invention includes a polysiloxane segment. The Si-containing resin also has a particle diameter that is not more than $1/15$ of the particle diameter of photocatalyst particles. Further, in the coating composition, the Si-containing resin is a dispersoid dispersed in an aqueous medium. The Si-containing resin may be partly dissolved in the aqueous medium. The range of the ratio of the particle diameter of the Si-containing resin to the particle diameter of photocatalyst particles, i.e., the particle diameter of the Si-containing resin/the particle diameter of photocatalyst particles, is $1/3000$ or more to $1/15$ or less, more preferably $1/1000$ or more to $1/15$ or less. The lower limit is more preferably $1/750$, particularly preferably $1/300$. The upper limit is more preferably $1/30$.

Preferably, the polysiloxane segment contained in the Si-containing resin contains a reactive group that, when subjected to a condensation reaction, can form a siloxane bond. The reactive group may include a hydroxyl (Si—OH) or alkoxy (Si—OR) group bonded to Si atom.

(Particle Diameter)

Preferably, the Si-containing resin has a particle diameter of 10 nm or more to 500 nm or less, more preferably 10 nm or more to 200 nm or less. The particle diameter is the value for greatest frequency (diameter) in a histogram obtained by measurement with a laser diffraction/scattering particle size distribution analyzer.

(Action Mechanism)

The Si-containing resin contains a polysiloxane segment, and the particle diameter is smaller than that of photocatalyst particles, whereby a coating film formed from the coating composition is rapidly hydrophilified through photoexcitation of the photocatalyst. Further, excellent weather fastness can be obtained over a long period of time. The reason why these excellent effects can be simultaneously attained has not been elucidated yet but is considered to be as follows. However, it should be noted that the following description is merely hypothetical and the present invention is not limited to the following hypothesis.

The reason why the weather fastness is obtained is considered that photocatalyst particles having a large diameter are stably held in a polysiloxane skeleton. Further, since the polysiloxane segment is contained, photoexcitation of the photocatalyst efficiently proceeds and, consequently, the coating film is hydrophilified on a higher level. On the other hand, when Si-containing resins free from the polysiloxane segment are used, hydrophilification does not satisfactorily proceed.

Organic components contained in the Si-containing resin are oxidatively decomposed by photocatalytic action of photocatalyst particles that are co-present in the coating film. On the other hand, the polysiloxane skeleton remains in the Si-containing resin. When the particle diameter of the photocatalyst particles is larger than that of the Si-containing resin, the size of the network of the polysiloxane skeleton in the coating film is considered to be suitable for holding the photocatalyst particles. Therefore, the photocatalyst particles can be present on the surface of the coating film over a long period of time. As a result, the coating film is hydrophilified over a long period of time. On the other hand, when the particle diameter of the photocatalyst particles is smaller than that of the Si-containing resin, for example, it is considered that photocatalyst particles are dropped from gaps in the polysiloxane skeleton, resulting in lowered weather fastness or damaged hydrophilifiability of the coating film.

(Polysiloxane Segment)

The Si-containing resin preferably includes a polysiloxane segment and an organic polymer segment, and is more preferably a silicone-modified resin containing a polysiloxane segment, still more preferably a silicone-modified resin containing a trifunctional polysiloxane segment. The presence of the polysiloxane segment and the trifunctional polysiloxane segment in the modified resin can be confirmed by the presence of a peak at a position of around −80° C. (±30° C.) and a peak around 150° C. (±30° C.) at a measurement frequency of 1 Hz in a spectrum of loss tangent of the coating film obtained, for example, with a solid viscoelasticity measuring apparatus (DMA). Further, preferably, the coating film exhibits a peak derived from Si—$CH_3$ at 1200 to 1300 $cm^{-1}$ and a peak derived from Si—O at 1000 to 1200 $cm^{-1}$ as measured by an infrared spectroscopic analysis. The content of siloxane that is a main component of the polysiloxane segment is preferably 20% or more by mass to 85% or less by mass in terms of $SiO_2$ based on the Si-containing resin. In this case, coating films having excellent durability and weather fastness can be formed.

(Organic Polymer Segment)

The presence of the organic polymer segment contained in the Si-containing resin can be confirmed by the measurement of non-ash content with a differential thermal/thermogravimetric simultaneous measuring apparatus (TG-DTA). Alternatively, the presence of an organic polymer segment can be confirmed by the presence of the peak of the organic polymer segment between a peak of dimethylpolysiloxane and a peak of methylpolysiloxane at a measurement frequency of 1 Hz in a spectrum of loss tangent of the coating film obtained with a solid viscoelastcitity measuring apparatus (DMA). The organic polymer segment includes a polymer obtained by polymerizing various vinyl monomers, polyurethane, and a composite thereof.

The organic polymer segment may contain a reactant of a silane compound as a constituent element thereof. The silane compound preferably has a coupling function. Specifically, examples of compounds usable herein include compounds that contain both at least one functional group selected from the group consisting of ethylenically unsaturated groups, hydroxyalkyl groups, aminoalkyl groups, epoxy groups, mercapto groups, isocyanate groups, isocyanurate groups, ureido, and sulfide groups, and a hydrolyzable and polycondensable functional group selected from alkoxy groups, hydroxyl groups, and halogen atoms. For example, 3-methacryloxypropyltrimethoxysilane may be used.

(Hydrophilifiable Functional Group)

The Si-containing resin used in the present invention contains, for example, a hydrophilifiable functional group that can improve, for example, the dispersibility of the Si-containing resin in aqueous media. At least one of anionic, cationic, and nonionic groups is usable as the hydrophilifiable group. Specifically, the use of anionic groups or a combination of anionic and nonionic groups is preferred. This allows the Si-containing resin, together with photocatalyst particles, to be stably dispersed.

Examples of anionic groups include carboxyl, carboxylate, sulfonic acid, sulfonate, phosphoric acid, acidic phosphoric ester, phosphorous acid, and sulfine groups. In particular, one of or at least two of carboxyl, carboxylate, sulfonic acid, and sulfonate groups is preferred. Among these anionic groups, carboxylate or sulfonate groups with the whole or a part of acid groups neutralized with a basic compound are more preferred.

The use of at least one of polyoxyalkylene groups such as polyoxyethylene, polyoxypropylene, polyoxyethylene-polyoxypropylene, and poly(oxyethylene-oxypropylene) groups is preferred as the nonionic group.

(Acid Value)

Preferably, the anionic group is contained in the Si-containing resin so that the acid value thereof is within the range of 10 mg KOH/g or more to 40 mg KOH/g or less. This allows the Si-containing resin to be more stably dispersed in an aqueous medium. The acid value may be measured according to JIS K 0070 (1992). Lower limit of the acid value is more preferably 15 mg KOH/g, and much more preferably 18 mg KOH/g. Upper limit of the acid value is more preferably 32 mg KOH/g. In the Si-containing resin used in the present invention, the acid value is more preferably, for example, 15 mg KOH/g or more to 40 mg KOH/g or less, 18 mg KOH/g or more to 40 mg KOH/g or less, 10 mg KOH/g or more to 32 mg KOH/g or less, 15 mg KOH/g or more to 32 mg KOH/g or less, and 18 mg KOH/g or more to 32 mg KOH/g or less. When the acid value is in the above-defined range, the Si-containing resin is self-dispersible, and, thus, there is no need to add a dispersing agent to the coating composition. Consequently, hydrophilification and weather fastness are simultaneously realized.

(Production of Resin)

The Si-containing resin is obtained by multi-stage polymerization. Specifically, the Si-containing resin is obtained by any one of or a combination of a plurality of the following processes (1) to (4). (1) A process that includes copolymerizing (block-copolymerizing and/or graft-copolymerizing) a polymerizable monomer and a polysiloxane. Here the polymerizable monomer used is any one of or both a monomer that can form polyurethane, and various vinyl monomers. The polymerizable monomer contains a silicon-free polymerizable monomer. A silicon-containing polymerizable monomer may be further contained. (2) A process that includes adding water to a polymer obtained by polymerizing a hydrolyzable silicon compound with a silicon-free polymerizable monomer in an organic solvent, and polycondensing the hydrolyzable silicon compound to form a polysiloxane segment, thereby obtaining a Si-containing resin. (3) A process that includes obtaining a polymer by polymerizing a hydrolyzable silicon compound with a silicon-free polymerizable monomer in an organic solvent, and successively supplying a hydrolyzable silicon compound to the polymer to form a polysiloxane segment, thereby obtaining a Si-containing resin. (4) A process that includes obtaining a polymer by polymerizing a hydrolyzable silicon compound with a silicon-free polymerizable monomer in an organic solvent, supplying a polysiloxane having a hydrolyzable group to the polymer, and polycondensing the hydrolyzable polysiloxane to obtain a Si-containing resin. A polymer obtained by emulsion-polymerizing a silicon compound capable of forming a polysiloxane with a polymerizable monomer is unfavorable because the polysiloxane segment is less likely to be formed. A process for producing an emulsion described in Japanese Patent Application Laid-Open No. 1997-52923 may be utilized as a production process similar to the process (1). Processes for producing composite resins described in patent literature 4 and 5 are also suitably utilized. Patent literature 4 and 5 disclose a method in which a polysiloxane having a hydrolyzable group is added to a resin component prepared by the process (2) to bind the resin component to the polysiloxane. This method can be said to be one in which the polymer in the process (4) is prepared by the process (2). That is, the method can be said to be one example of a combination of the processes (2) and (4).

Photocatalyst Particles

The type of photocatalyst particles used in the present invention is not particularly limited as long as the particles have a photocatalytic activity. Examples of photocatalyst particles include particles of metal oxides such as titanium oxide ($TiO_2$), ZnO, $SnO_2$, $SrTiO_3$, $WO_3$, $Bi_2O_3$, and $Fe_2O_3$. Titanium oxide particles are preferred, and anatase-type titanium oxide particles are more preferred. Titanium oxide is harmless, chemically stable, and available at low cost. Titanium oxide has a high band gap energy. Accordingly, ultraviolet light is necessary for photoexcitation. Since visible light is not absorbed in a photoexcitation process, color development derived from a complementary color component does not occur. Titanium oxide is available in various forms such as powdery, sol, and solution forms. Any form can be used as long as the form exhibits photocatystic activity.

Titanium oxide is excited by ultraviolet light contained, for example, in sunlight and fluorescent lamps to induce a photocatalytic reaction. In recent years, light sources that hardly contain ultraviolet light such as white light emitting diodes have become widespread. For this reason, various photocatalyst materials responsive to visible light have been proposed. Examples thereof include titanium oxide doped with nitrogen atom and anionic atom, titanium oxide particles with a copper compound supported thereon, and composite materials of titanium oxide particles and tungsten oxide. Photocatalyst materials responsive to visible light like this are also usable in the present invention.

Photocatalyst particles used in the present invention has a diameter which is larger than that of the Si-containing resin particles. In a preferred embodiment of the present invention, the photocatalyst particles preferably have a diameter of 1 µm or more to 30 µm or less. More preferably, the photocatalyst particles have a diameter of 3 µm or more to 30 µm or less. This particle diameter is the value for greatest frequency (diameter) in a histogram obtained with a laser diffraction/scattering particle size distribution analyzer. Photocatalyst particles can be stably held on the coating film over a long period of time by adjusting the particle diameter of the photocatalyst particles to this range and adjusting the particle diameter of the Si-containing resin to the above-defined range. Further, the covering property of the substrate can be satisfactorily ensured without the need to wastefully increase the amount of the coating material used.

In general, for the photocatalyst particles, the specific surface area increases with a reduction in particle diameter, and, thus, small particles have been regarded as preferable because a high photocatalytic activity is obtained. Accordingly, nano particles having a diameter of a several hundred of nanometers or less have been extensively used. The present invention, however, is characterized in that particles having a size that is much larger than conventional particles are used. As described above, when such large particles are used and combined with the Si-containing resin, coating films can be realized that simultaneously realize excellent weather fastness and hydrophilifiability.

Photocatalyst particles used in the present invention are preferably the so-called secondary particles formed by aggregation of nano particles. The diameter of primary particles is preferably 1 nm or more to 300 nm or less, more preferably 10 nm or more to 200 nm or less. When aggregated particles are used, the specific surface area of photocatalyst particles is so large that the photocatalytic activity can be enhanced. Here the diameter of primary particles can be determined by observation of a dried product or coating film of a photocatalyst particle material under a scanning electron microscope (SEM). Specifically, the diameter of primary particles is calculated as a number mean value obtained by measuring the length of any 100 particles present in a field of view under a scanning electron microscope at a magnification of 200000 times. The particles are preferably spherical but may have an irregular shape. When the particles have an irregular shape, the approximate length of the particles is calculated, for example, as ((major axis+minor axis)/2).

The content of photocatalyst particles in the coating composition according to the present invention is preferably 5% or more by mass to 20% or less by mass based on the solid content of the coating composition. The content is more preferably in a range from more than 5% by mass to less than or equal to 15% by mass. When the content is in the above-defined range, the hydrophilification by photocatalytic action of the coating film can be quickly achieved. Further, a moderate coating film strength can be obtained.

In a preferred embodiment of the present invention, at least one metal selected from the group consisting of vanadium, iron, cobalt, nickel, palladium, zinc, ruthenium, rhodium, lead, copper, silver, platinum, and gold and/or a metal compound of the metal can be added to the coating composition. This contributes to the development of a higher photocatalytic ability. The metal or the metal compound may be added by a method in which the metal or the metal compound is mixed with and dissolved or dispersed in the coating composition, or by a method in which the metal or the metal compound is supported on photocatalyst particles.

Pigment

In a preferred embodiment of the present invention, a pigment selected from inorganic pigments and organic pigments may be contained in the coating composition.

Suitable inorganic pigments usable herein include colored pigments and extender pigments, for example, metal oxide pigments such as titanium oxide, zinc flower, iron oxide red, chrome oxide, cobalt blue, and iron black; metal hydroxide pigments such as alumina white and yellow iron oxide; ferrocyanic compounds such as iron blue; lead chromate pigments such as chrome yellow, zinc chromate, and molybdenum red; sulfide pigments such as zinc sulfide, vermillion, cadmium yellow, and cadmium red; sulfate pigments such as selenium compounds, barite, and precipitated barium sulfate; carbonate pigments such as heavy calcium carbonate, and precipitated calcium carbonate; silicate pigments such as hydrous silicates, clay, and ultramarine blue; carbon pigments such as carbon black; metal powder pigments such as aluminum powder, bronze powder, and zinc powder; and pearl pigments such as mica and titanium oxide pigments.

Suitable organic pigments usable herein include organic colored pigments, for example, nitroso pigments such as naphthol green B; nitro pigments such as naphthol S; azo pigments such as lithol red, lake red C, fast yellow, and naphthol red; and condensed polycyclic pigments such as alkali blue red, rhodamine lake, quinacridone red, dioxazine violet, and isoindolinone yellow.

In the present invention, the photocatalyst particles have a very large diameter. Accordingly, preferably, the coating composition according to the present invention is used as a colored coating material that possesses an excellent capability of covering the substrate. In this case, preferably, the photocatalytst particles, the Si-containing resin, and the pigment in the coating composition are contained at the following blending ratio.

Photocatalyst particles: 5% or more by mass to 20% or less by mass, more preferably more than 5% by mass to 15% or less by mass, based on solid content.

Si-containing resin: 30% or more by mass to 70% or less by mass, more preferably 40% or more by mass to 65% or less by mass, based on solid content.

Pigment and the Like: Balance.

When the components are in the above-defined respective content ranges, practical colored coating materials can be obtained without damaging the above effects.

Aqueous Medium

Preferable aqueous media usable in the present invention include water, organic solvents miscible with water, and mixtures thereof. Organic solvents miscible with water include, for example, alcohols such as methanol, ethanol, n- and iso-propanol; ketones such as acetone and methyl ethyl ketone; polyalkylene glycols such as ethylene glycol, diethylene glycol, and propylene glycol; alkyl ethers such as polyalkylene glycol; and lactams such as N-methyl-2-pyrrolidone. In the present invention, only water may be used as the aqueous medium. Alternatively, a mixture composed of water and an organic solvent miscible with water may be used. Further, only the organic solvent miscible with water may be used. Preferably, only water or a mixture composed of water and an organic solvent miscible with water is used from the viewpoint of safety and load on environment. The use of water only is particularly preferred. The amount of the aqueous medium may be properly determined. For example, the aqueous medium is preferably added in such an amount that, in the coating composition, the solid component concentration is 30% or more by mass to 80% or less by mass, more preferably 30% or more by mass to 60% or less by mass. When the solid component concentration is in the above-defined range, in some cases, the storage stability and coating workactivity of the coating composition and the covering property of the film can be ensured.

Optional Components

In a preferred embodiment of the present invention, the coating composition according to the present invention may further contain inorganic oxide particles in such an amount that does not damage the photocatalytic activity. For example, inorganic oxide particles having a refractive index of 2 or less may be used as the inorganic oxide particles. Specific examples of inorganic oxide particles having a refractive index of 2 or less include particles of single oxides such as silica, alumina, zirconia, zircon, ceria, yttria, boronia, magnesia, calcia, and hafnia and particles of composite oxides such as calcium silicate. The inorganic oxide particles are oxide particles that are different from the photocatalyst particles. Such inorganic oxide particles are used as fillers. More preferably, for example, calcium carbonate whiskers, aluminum borate whiskers, talc, barium sulfate, quartz sand, diatomaceous earth, kaolin, clay, potter's clay, barium carbonate, and zinc flower can be utilized.

In one embodiment of the present invention, for example, colored pigment particles, resin particles such as latex and acryl beads, and design material particles such as mica and glass beads may be added to the coating composition in such an amount that does not damage the photocatalytic activity.

In one embodiment of the present invention, if necessary, various additives such as clay minerals, waxes, surfactants, ultraviolet absorbers, antioxidants, and plasticizers may be added to the coating composition according to the present invention.

Production of Coating Composition

The coating composition according to the present invention can be obtained by dispersing photocatalyst particles, a dispersion of Si-containing resin, and, if desired, a pigment at the above specific blending ratio in an aqueous medium. The photocatalyst particles and the pigment may be in a powder form or may be in a slurry form that has been previously prepared from the powder. In dispersing photocatalyst particles, care should be taken in stirring conditions so that the particle diameter of photocatalyst particles is not below a predetermined range. When wet grinding is carried out with a mechanical dispergator using a dispersing media such as glass beads and ceramic beads, excessive shearing force is applied. In producing the coating composition according to the present invention, preferably, a kneading apparatus such as a stirring apparatus that is of a vertical single shaft type and that includes a disk provided at the front end of the shaft (for example, a dissolver manufactured by Inoue Seisakusho Co., Ltd.) is used without the need to use dispersing media such as glass beads.

Base to which Coating Composition is Applied

The coating composition according to the present invention is used for the formation of a photocatalytic film on the surface of a base. Any material that can form a photocatalyst layer on the surface may be used as the base in the present invention. The base may be formed of various materials independently of whether the material is an inorganic material or an organic material. The shape of the base is not also limited. Examples of bases that are preferred from the viewpoint of materials include metals, ceramics, glasses, plastics, rubbers, stones, cements, concretes, fibers, woven fabrics, woods, papers, and combinations thereof, laminates thereof, and the above materials with at least one layer formed on the surface thereof. Examples of bases that are preferred from the viewpoint of use applications include building materials, exterior of buildings, window frames, window glass, structural members, exterior, interior, and coating of vehicles, exterior and interior of mechanical devices or articles, dust covers and coating, traffic signs, various display devices, advertising pillars, sound insulation walls for roads, sound insulation walls for railways, bridges, exterior and coating of guard rails, interior and coating of tunnels, insulators, solar battery covers, heat collection covers for solar water heaters, PVC greenhouses, covers for vehicle illuminating lamps, outdoor lighting equipment, tables, and exterior and interior materials for application onto the surface of the above articles, for example, films, sheets, and seals.

Application of Coating Composition

The coating composition according to the present invention is applied to the above base. The coated base is then properly dried and used to form a photocatalyst layer containing photocatalyst particles. The coating composition may be applied by generally and extensively used coating methods such as brush coating, roller application, spray coating, roller coating, curtain coating, dip coating, flow coating, and screen printing. After coating of the coating composition on the base, the coating is dried at room temperature. If necessary, the coating may be heat-dried. For example, the drying temperature is preferably 5° C. or more to 500° C. or less. When the resin is contained in at least a part of the base, the drying temperature is preferably 10° C. or more to 200° C. or less, for example, in consideration of heat-resistant temperature of the resin. The photocatalyst member thus obtained is a coated body of the present invention.

When the coating composition is applied and followed by heat-drying or firing treatment, any method may be utilized in the treatment as long as heat reaches the surface of the base. That is, the base may be entirely heated, alternatively may be partially heated.

In the present invention, the surface of the base may be previously heated before the application of the coating composition on the base. Preliminary heating is preferably carried out by heating the surface of the base at a temperature of 20° C. or more to 200° C. or less. The photocatalytic coating composition coated on the surface of the heated base is advantageous in that a film can be obtained that is even and has excellent adhesion and film strength.

In a preferred embodiment of the present invention, in applying the coating composition on the base, the base is pretreated from the viewpoint of improving the adhesion between the coating composition and the base. Examples of preferred pretreatment include washing, polishing, electrolytic polishing, electric oxidation, and sandblasting. A method may also be adopted in which a photocatalyst layer is formed using the coating composition of the present invention on a primer layer on the base, for example, by coating an undercoating agent on the base.

Coated Body

The coated body according to the present invention includes at least a base and a photocatalyst layer that is formed of the coating composition according to the present invention and formed by applying the coating composition on the surface of the base. Preferably, the photocatalyst layer obtained by applying the coating composition according to the present invention on the base has a thickness of 1 μm or more to 100 μm or less, more preferably 3 μm or more to 50 μm or less. Further, preferably, the thickness of the photocatalyst layer is in the above-defined range and is equal to or more than the diameter of the photocatalyst particles. When this requirement is satisfied, the photocatalyst particles can be held within the coating film and, thus, the weather fastness can be satisfactorily developed.

EXAMPLES

The present invention is further illustrated by Examples that are not intended as a limitation of the invention. In the following Examples, the following materials were used in the preparation of the coating composition.

Photocatalyst Particles

Photocatalyst powder: anatase-type titanium oxide powder (manufactured by Ishihara Sangyo Kaisha Ltd., tradename: ST-21)

Photocatalyst dispersion: anatase-type titanium oxide sol (manufactured by Ishihara Sangyo Kaisha Ltd., tradename: STS-21)

Si-Containing Resin Dispersion

1. A Si-containing resin dispersion 1 containing a trifunctional polysiloxane segment: a urethane-composited polysiloxane-modified acrylic resin dispersion (concentration of Si-containing resin: 35% by mass, particle diameter of Si-containing resin: 70 nm, acid value: 19 mg KOH/g, siloxane content (in terms of $SiO_2$): 30% by mass)

2. A Si-containing resin dispersion 2 containing a trifunctional polysiloxane segment: a polysiloxane-modified acrylic resin dispersion (concentration of Si-containing resin: 40% by mass, particle diameter of Si-containing resin: 80 nm, acid value: 31 mg KOH/g, siloxane content (in terms of $SiO_2$): 30% by mass)

3. A Si-containing resin dispersion 3 containing a difunctional polysiloxane segment: a polysiloxane-modified acrylic resin emulsion (concentration of Si-containing resin: 45% by mass, particle diameter of Si-containing resin: 120 nm, acid value: 13 mg KOH/g, siloxane content (in terms of $SiO_2$): 10% by mass)

4. A Si-containing resin dispersion 4 free from a polysiloxane segment: a polysiloxane-modified acrylic resin emulsion (concentration of Si-containing resin: 40% by mass, particle diameter of Si-containing resin: 80 nm, siloxane content (in terms of $SiO_2$): 25% by mass)

5. A Si-containing resin dispersion 5 free from a polysiloxane segment: a silicone-modified acrylic resin emulsion (concentration of Si-containing resin: 50% by mass, particle diameter of Si-containing resin: 180 nm, siloxane content (in terms of $SiO_2$): 2% by mass)

6. A Si-containing resin dispersion 6 free from a polysiloxane segment: A resin mixture composed of equal amounts (in terms of mass ratio of solid component) of a silicone resin emulsion that mainly contains a trifunctional polysiloxane (concentration of Si-containing resin: 50% by mass, particle diameter of Si-containing resin: 2600 nm, siloxane content (in terms of $SiO_2$): 95% by mass), and an acrylic resin emulsion free from a Si element (particle diameter: 180 nm, resin concentration: 50% by mass)

Pigment

A rutile-typed titanium oxide powder covered with alumina and silica (manufactured by Ishihara Sangyo Kaisha Ltd., tradename: CR-90)

Example 1

A coating composition 1 including the photocatalyst powder, the Si-containing resin dispersion 1, and the pigment dispersed in ion-exchanged water was prepared. The coating composition has a solid component concentration of 38% by mass. The content of the photocatalyst particles, the content of the Si-containing resin component, and the content of the pigment in the coating composition were 15% by mass, 60% by mass, and 25% by mass, respectively, based on the total solid component mass. The dispersion was carried out by wet dispersion method through stirring with a stirring apparatus that is of a vertical single shaft type and that includes a disk provided at the front end of the shaft (manufactured by Inoue Seisakusho Co., Ltd., a dissolver model C-4, blade 80 mmφ) at 400 rpm for 30 min without the use of dispersion media. In the coating composition, the particle diameter of the photocatalyst particles and the particle diameter of the pigment were 10 μm and 0.8 μm, respectively. The particle diameter was calculated by reading summit of each histogram in the particle size distribution obtained with microtrack MT3000II manufactured by NIKKISO Co., Ltd.

An about 80 μm-thick coating film (a photocatalyst layer) was obtained by coating the coating composition on a PTFE sheet using a film applicator with a gap of 15 mil (1 mil=25.4 μm) (NO. 548-YKG manufactured by YASUDA SEIKI SEISAKUSHO, LTD.) and drying the coating. The coating film was cut into a strip form of 10 mm×30 mm, and the PTFE sheet was separated to obtain a sample. The sample was installed in a solid viscoelasticity apparatus, and a loss tangent was measured at a frequency of 1 Hz in a tensile mode. FIG. 1 shows a change curve of loss tangent against temperature. In FIG. 1, a peak appeared at 151° C.

Example 2

A coating composition 2 was prepared in the same manner as in Example 1, except that the Si-containing resin dispersion 2 was used. A sample obtained in the same manner as in Example 1 except for use of the coating composition 2 exhibited a peak at 151° C. in a change curve of loss tangent against temperature.

Example 3

A coating composition 3 was prepared in the same manner as in Example 1, except that the photocatalyst powder, the Si-containing resin component, and the pigment were contained in respective amounts of 10% by mass, 60% by mass, and 30% by mass based on the total solid component mass. A sample obtained in the same manner as in Example 1 except for use of the coating composition 3 exhibited a peak at 151° C. in a change curve of loss tangent against temperature.

Example 4

A coating composition 4 was prepared in the same manner as in Example 1, except that the photocatalyst powder, the Si-containing resin component, and the pigment were contained in respective amounts of 5% by mass, 60% by mass, and 35% by mass based on the total solid component mass. A sample obtained in the same manner as in Example 1 except for use of the coating composition 4 exhibited a peak at 151° C. in a change curve of loss tangent against temperature.

Example 5

A coating composition 5 including the photocatalyst powder, the Si-containing resin dispersion 3, the pigment, and an additive (a hindered amine-based photostabilizer: HALS) dispersed in ion-exchanged water was prepared. The coating composition had a solid component concentration of 38% by mass. The content of the photocatalyst particles, the content of the Si-containing resin component, the content of the pigment, and the content of the additive (HALS) were 15% by mass, 60% by mass, 25% by mass, and 1% by mass (as an effective component based on resin solid component content), respectively, based on the total solid component mass. The coating composition 5 was prepared in the same manner as in Example 1 except for the above matters.

Comparative Example 1

A coating composition 6 including the photocatalyst powder, the Si-containing resin dispersion 1, and the pigment dispersed in ion-exchanged water was prepared. The coating composition had a solid component concentration of 38% by mass. The content of the photocatalyst particles, the content of the Si-containing resin component, and the content of the pigment were 15% by mass, 60% by mass, and 25% by mass, respectively, based on the total solid component mass. The dispersion was carried out by wet dispersion method through stirring with a stirring apparatus that is of a vertical single shaft type and that includes a disk provided at the front end of the shaft (manufactured by Inoue Seisakusho Co., Ltd., a dissolver model C-4, blade 80 mmφ) at 400 rpm for 30 min using glass beads as dispersion media. In the coating composition, the particle diameter of the photocatalyst particles and the particle diameter of the pigment were 0.8 μm and 0.8 μm, respectively. The particle diameter was calculated by reading summit of each histogram in the particle size distribution obtained with microtrack MT3000II manufactured by NIKKISO Co., Ltd. A sample obtained in the same manner as in Example 1 except for use of the coating composition 6 exhibited a peak at 151° C. in a change curve of loss tangent against temperature.

Comparative Example 2

A coating composition 7 was prepared in the same manner as in Example 1, except that the Si-containing resin dispersion 4 was used. A sample obtained in the same manner as in Example 1 except for use of the coating composition 7 exhibited no peak at 120° C. to 180° C. in a change curve of loss tangent against temperature.

Comparative Example 3

A coating composition 8 was prepared in the same manner as in Example 1, except that the Si-containing resin dispersion 5 was used. A sample obtained in the same manner as in Example 1 except for use of the coating composition 8 exhibited no peak at 120° C. to 180° C. in a change curve of loss tangent against temperature.

Comparative Example 4

A coating composition 9 including the photocatalyst dispersion, the Si-containing resin dispersion 1, and the pigment dispersed in ion-exchanged water was prepared. The coating composition had a solid component concentration of 38% by mass. The content of the photocatalyst particles, the content of the Si-containing resin component, and the content of the pigment were 15% by mass, 60% by mass, and 25% by mass, respectively, based on the total solid component mass. The dispersion was carried out by wet dispersion method through stirring with a stirring apparatus that is of a vertical single shaft type and that includes a disk provided at the front end of the shaft (manufactured by Inoue Seisakusho Co., Ltd., a dissolver model C-4, blade 80 mmφ) at 400 rpm for 30 min without the use of dispersion media. In the coating composition, the particle diameter of the photocatalyst particles and the particle diameter of the pigment were 0.5 μm and 0.8 μm, respectively. The particle diameter was calculated by reading summit of each histogram in the particle size distribution obtained with microtrack MT3000II manufactured by NIKKISO Co., Ltd. A sample obtained in the same manner as in Example 1 except for use of the coating composition 9 exhibited a peak at 151° C. in a change curve of loss tangent against temperature.

Comparative Example 5

A coating composition 10 was prepared in the same manner as in Example 1, except that the Si-containing resin dispersion 6 was used. A sample obtained in the same manner as in Example 1 except for use of the coating composition 10 exhibited no peak at 120° C. to 180° C. in a change curve of loss tangent against temperature.

Application of Coating Composition (Film Formation)

An amine adduct-curable special modified epoxy rust preventive undercoating material was coated at a coverage of 100 g/m² by air spraying on a surface of a previously washed aluminum plate (50 mm×50 mm), followed by curing the undercoated plate at room temperature for one day. Thereafter, a colored pigment was added to the coating composition to regulate the brightness (L*) to about 70 to 80, and the mixture was coated at a coverage of 200 g/m², followed by curing the coated matter at room temperature for one or two weeks or more to prepare a coated body that was then used for evaluation. Coated bodies obtained using the coating compositions 1 to 10 were designated as coated bodies 1 to 10.

Evaluation of Coated Body

For the coated bodies thus obtained, hydrophilicity and weather fastness were evaluated by the following methods.

Evaluation of Hydrophilicity

The coated body was set in an Open Flame Carbon Arc Weathering instrument (Sunshine Weather-Ometer (SWOM): S-300 manufactured by Suga Test Instruments Co., Ltd.) specified in JIS B 7753 and was exposed to weather conditions for 1000 hr, and comparison was made between an initial contact angle (C.A. (°) 0 h) and a contact angle after the elapse of 1000 hr (C.A. (°) 1000 h). For exposure conditions, one cycle consisted of 2 hr in total, specifically consisted of a black panel temperature of 63° C., a light irradiation (1 hr 42 min) and light irradiation/water showering (18 min). This cycle was repeated.

Evaluation of Weather Fastness

The coated body was set in an Open Flame Carbon Arc Weathering Instrument (Sunshine Weather-Ometer (SWOM): S-300 manufactured by Suga Test Instruments Co., Ltd.) specified in JIS B 7753 and was exposed to weather conditions for 1000 hr, and a difference in brightness between the initial brightness and the brightness after the elapse of 1000 hr (ΔL*) was determined.

Results

The results were as shown in Table 1. Each evaluation was carried out according to the following criteria.

Evaluation Criteria

Hydrophilicity

○: Difference in contact angle between initial contact angle and contact angle after elapse of 1000 hr from the exposure with SWOM: not less than −20° x: Difference in contact angle between initial contact angle and contact angle after elapse of 1000 hr from the exposure with SWOM: not more than −20°

Weather Fastness

○: Absolute value of difference in brightness between initial brightness and brightness after the elapse of 1000 hr from the exposure with SWOM (ΔL*): less than 2.0 x: Absolute value of difference in brightness between initial brightness and brightness after the elapse of 1000 hr from the exposure with SWOM (ΔL*): not less than 2.0

What is claimed is:

1. A coating composition comprising: a Si-containing resin; photocatalyst particles; and an aqueous medium, the Si-containing resin and the photocatalyst particles being dispersed in the aqueous medium, wherein
the Si-containing resin comprises a polysiloxane segment and
the Si-containing resin has a particle diameter that is not more than 1/15 of the particle diameter of the photocatalyst particles, wherein the polysiloxane segment is a trifunctional polysiloxane segment and the Si-containing resin exhibits at least one spectral peak at a position of 120° C. or more to 180° C. or less in a change curve of loss tangent (tan δ) against temperature as measured at a frequency of 1 Hz with a solid viscoelasticity measuring apparatus based on JIS K 7244-4.

2. The coating composition according to claim 1, wherein the photocatalyst particles have a diameter of 1 μm or more to 30 μm or less in terms of volume mean diameter measured with a laser diffraction/scattering particle size distribution analyzer.

3. The coating composition according to claim 1, wherein the Si-containing resin has a particle diameter of 10 nm or more to 500 nm or less in terms of volume mean diameter as measured with a laser diffraction/scattering particle size distribution analyzer.

TABLE 1

|  | Peak of tanδ at 120° C. to 180° C. | Particle diameter of Si-containing resin (μm) | Diameter of photo-catalyst particles (μm) | Content of photo-catalyst in solid component content (%) | Weather fastness Evaluation result | ΔL* | Hydrophilicity Evaluation result | C.A (°) 0 h/ 1000 h |
|---|---|---|---|---|---|---|---|---|
| Example 1 | Present | 0.07 | 10 | 15 | ○ | −0.1 | ○ | 87/6 |
| Example 2 | Present | 0.08 | 10 | 15 | ○ | +0.8 | ○ | 83/16 |
| Example 3 | Present | 0.07 | 10 | 10 | ○ | −0.7 | ○ | 86/20 |
| Example 4 | Present | 0.07 | 10 | 5 | ○ | −1.0 | ○ | 85/59 |
| Example 5 | Absent | 0.12 | 10 | 15 | ○ | +0.1 | ○ | 100/45 |
| Comparative Example 1 | Present | 0.07 | 0.8 | 15 | x | +4.6 | ○ | 80/5 |
| Comparative Example 2 | Absent | 0.08 | 10 | 15 | ○ | −0.3 | x | 95/99 |
| Comparative Example 3 | Absent | 0.18 | 10 | 15 | x | +5.6 | ○ | 80/5 |
| Comparative Example 4 | Present | 0.07 | 0.5 | 15 | x | +8.2 | ○ | 80/5 |
| Comparative Example 5 | Absent | 2.60 | 10 | 15 | x | +8 | ○ | 100/5 |

4. The coating composition according to claim 1, wherein the photocatalyst particles are secondary particles formed by the aggregation of nano particles.

5. The coating composition according to claim 1, wherein the Si-containing resin has an acid value of 10 mg KOH/g or more to 40 mg KOH/g or less.

6. The coating composition according to claim 1, wherein the photocatalyst particles are contained in an amount of 5% or more by mass to 20% or less by mass in total solid content.

7. The coating composition according to claim 1, which further contains a pigment.

8. The coating composition according to claim 1, wherein the Si-containing resin is contained in an amount of 30% or more by mass to 70% or less by mass in total solid content.

9. A coated body comprising at least a base and a photocatalyst layer that is provided on the surface of the base and formed of the coating composition according to claim 1.

10. A process for forming the coated body according to claim 9, the process at least comprising:
   providing a base, and
   applying the coating composition according to claim 1 on the surface of the base to form a photocatalyst layer.

* * * * *